United States Patent
Ebeling et al.

(10) Patent No.: US 6,338,326 B1
(45) Date of Patent: Jan. 15, 2002

(54) PROCESS AND APPARATUS FOR DETECTING EXHAUST-GAS-IMPAIRING AND CATALYST-DAMAGING MISFIRES IN THE CASE OF INTERNAL-COMBUSTION ENGINES

(75) Inventors: Karl-Heinz Ebeling, Munich; Erich Eichlinger, Geisenfeld, both of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/534,554

(22) Filed: Mar. 27, 2000

(30) Foreign Application Priority Data

Mar. 26, 1999 (DE) .......................... 199 13 746

(51) Int. Cl.⁷ .............................. F02B 77/08
(52) U.S. Cl. ................................. 123/198 F
(58) Field of Search ......................... 123/198 F

(56) References Cited

U.S. PATENT DOCUMENTS

| | | | | | |
|---|---|---|---|---|---|
| 4,188,933 A | * | 2/1980 | Iizuka | ..................... | 123/198 F |
| 4,467,758 A | * | 8/1984 | Ueno et al. | .............. | 123/198 F |
| 4,821,686 A | * | 4/1989 | Baika et al. | .............. | 123/198 F |
| 4,909,223 A | * | 3/1990 | Ituzi et al. | ................ | 123/198 F |
| 5,117,790 A | * | 6/1992 | Clarke et al. | ............ | 123/198 F |
| 5,460,129 A | * | 10/1995 | Miller et al. | ............. | 123/198 F |
| 5,727,527 A | * | 3/1998 | Mueller et al. | .......... | 123/198 F |

OTHER PUBLICATIONS

"Methods of On–Board Misfire Detection" in SAE–Paper 900232, 1990, Gunther Plapp, Martin Klenk, and Winfred Moser, pp. 9–21.*

* cited by examiner

*Primary Examiner*—Marguerite McMahon
*Assistant Examiner*—Jason A Benton
(74) *Attorney, Agent, or Firm*—Crowell & Moring LLP

(57) ABSTRACT

In a method and apparatus for detecting exhaust-gas-impairing and catalyst-damaging misfires in an internal-combustion engine, having a lambda probe arranged behind a catalyst, combustion misfires in at least one cylinder of the internal-combustion engine are detected by analysis of rotational engine speeds (or by another technique for detection of the erratic running of the engine). To improve the diagnosis of exhaust-gas-impairing of catalyst-damaging misfires a two stage method is provided to determine the lambda probe voltage, to assign it to the detected combustion misfires and to determine the respective type of misfire as a function of the probe voltage.

18 Claims, 2 Drawing Sheets

PROCESS AND APPARATUS FOR DETECTING EXHAUST-GAS-IMPAIRING AND CATALYST-DAMAGING MISFIRES IN THE CASE OF INTERNAL-COMBUSTION ENGINES

BACKGROUND AND SUMMARY OF THE INVENTION

This application claims the priority of German patent document 199 13 746.3, filed Mar. 26, 1999, the disclosure of which is expressly incorporated by reference herein.

The invention relates to a method and apparatus for detecting exhaust-gas-impairing and catalyst-damaging misfires in internal-combustion engineS.

Governments increasingly demand monitoring of an engine to detect combustion misfires in the course of an on-board diagnosis; and the methods of this type are generally known. For example, German Patent Document DE 40 02 208 A1 describes a method for detecting combustion misfires in an engine based on a lambda signal generated by a lambda probe. In this method, the amplitude of a signal fraction which has the frequency of the camshaft is determined, and the average of successive amplitude values is calculated. If the average amplitude value exceeds a threshold value, a conclusion is drawn that misfires are present.

International Patent Document WO 92/11522 also describes a diagnostic device for detecting combustion misfires in an internal-combustion engine. In this publication, it is generally pointed out that three groups of detection methods are known. The first group considers process output values, such as erratic running, noise, vibrations or the lambda probe signal. The second group of diagnostic methods considers process input values, such as the ignition current or the output signals of the end phases for the injection valves. The third group finally considers the process itself by means of a pressure determination in the combustion space.

However, there are different types of combustion misfires, and a distinction is generally drawn between exhaust-gas-impairing and catalyst-damaging misfires.

One objective for the monitoring of exhaust-gas-relevant misfires is to report a fault when a defined exhaust gas threshold value is exceeded. For example, a misfire rate can be determined for four respective intervals at 1,000 r.p.m.

In the case of still higher misfire rates, however, the catalyst may be damaged when unburnt fuel flows through it and it is overheated. In this circumstance, a fault must be reported and the concerned cylinder or cylinders must be switched off. According to the operating range of the engine, the analysis of catalyst-damaging misfires takes place, for example, in one or several intervals at 200 engine revolutions.

The disadvantage of the above-mentioned known diagnostic techniques for detecting combustion misfires is that all misfires are accorded the same treatment, no matter what the causes are. That is, no differentiation is made as to whether the fuel supply or the ignition is interrupted, or whether another fault exists. Consequently, for reasons of safety, in the event of an interruption of the fuel supply, it is treated (incorrectly) as a catalyst-damaging combustion misfire, even though damage to the catalyst is not occurring at all or will occur only at a much higher misfire rate. A fault report and a cylinder switch-off therefore takes place prematurely, at a time when it would not be necessary.

German Patent Document DE 40 19 573 A1 discloses a method for detecting combustion misfires and/or a non-uniform injection in an internal-combustion engine, by analyzing the fraction or the partial pressure of the oxygen in the exhaust gas to determine the type of combustion misfire.

In the publication "Methods of On-Board Misfire Detection", *SAE Paper* 900232, 1990, by G. Plapp, M. Klenk and W. Moser, discloses an arrangement for combustion misfire detection, either by analysis of the lambda probe signal or of the erratic running of the engine. By analyzing the lambda probe signal, it can be determined whether the combustion misfire was caused by a defective injection or by a defective ignition.

However, the above-mentioned techniques for detecting combustion irregularities by analysis of the lambda probe signal are relatively sluggish and partially inaccurate.

It is therefore an object of the present invention to provide method of the initially mentioned type by which can accurately detect combustion irregularities and can easily be determine the type of misfires.

This and other objects and advantages are achieved by the method according to the invention, in which the occurrence of a combustion misfire is recognized by detecting an erratic rotational speed or erratic running of the engine. On the other hand, the type of misfire is determined by analysis of the lambda probe voltage. In this case, the lambda probe voltage is determined with regard to the recognized combustion misfire, and as a function of this probe voltage, a conclusion will then be drawn with respect to the type of misfire.

To determine whether unburnt fuel reaches the catalyst, the lambda probe arranged downstream of the catalyst is used. When the ignition fails, the probe behind the catalyst will detect a "rich mixture", indicated by a voltage above a defined limit value. When the injection fails, the catalyst is not acted upon by unburnt fuel so that the probe signal indicates a "lean mixture", in which case the voltage is lower than a defined limit value.

On the whole, the probe voltage is therefore used as a decision criterion for indicating the type of misfire and is therefore included in a two-stage method. In the first stage, the combustion irregularity is determined by analysis of the rotational speed or another detection of an erratic running.

According to an advantageous embodiment of the invention, the probe signal can be filtered for analysis. As an alternative, the signal average can also be determined in an interval during which misfires occur. In the latter case, preferably the gas running times and/or the times for the flooding of the catalyst with oxygen can also be taken into account.

In a preferred embodiment of the invention, it is determined whether the lambda probe voltage exceeds a first limit value. As a function of the lambda probe voltage, a conclusion is then drawn with respect to the type of misfire: that is, a faulty ignition, a faulty injection or another defect.

In an alternative embodiment, two limit values are determined. If the probe voltage is above the upper limit value, a faulty ignition is assumed. If the probe voltage is below the lower limit value, a faulty injection is assumed.

A transition probe or a broad-band probe can be used as the lambda probe.

Because a defectively operating cylinder is switched off at a designated rate of catalyst-damaging misfires, switch-off can take place precisely when the catalyst would actually be damaged. A fault report with respect to "catalyst-damaging misfires" would therefore take place later in comparison to conventional diagnostic operations. This is permissible because damage to the catalyst does not in fact occur in the case of an exhaust-gas-impairing misfire. On the whole, a switch-off of a cylinder can therefore be delayed or prevented.

By storing the misfires and the type of misfires in a memory (particularly in the memory of a diagnostic unit), the search for defects in the repair shop can be considerably simplified.

Other objects, advantages and novel features of the present invention will become apparent from the following detailed description of the invention when considered in conjunction with the accompanying drawings.

DETAILED DESCRIPTION OF THE DRAWINGS

Figure 1:
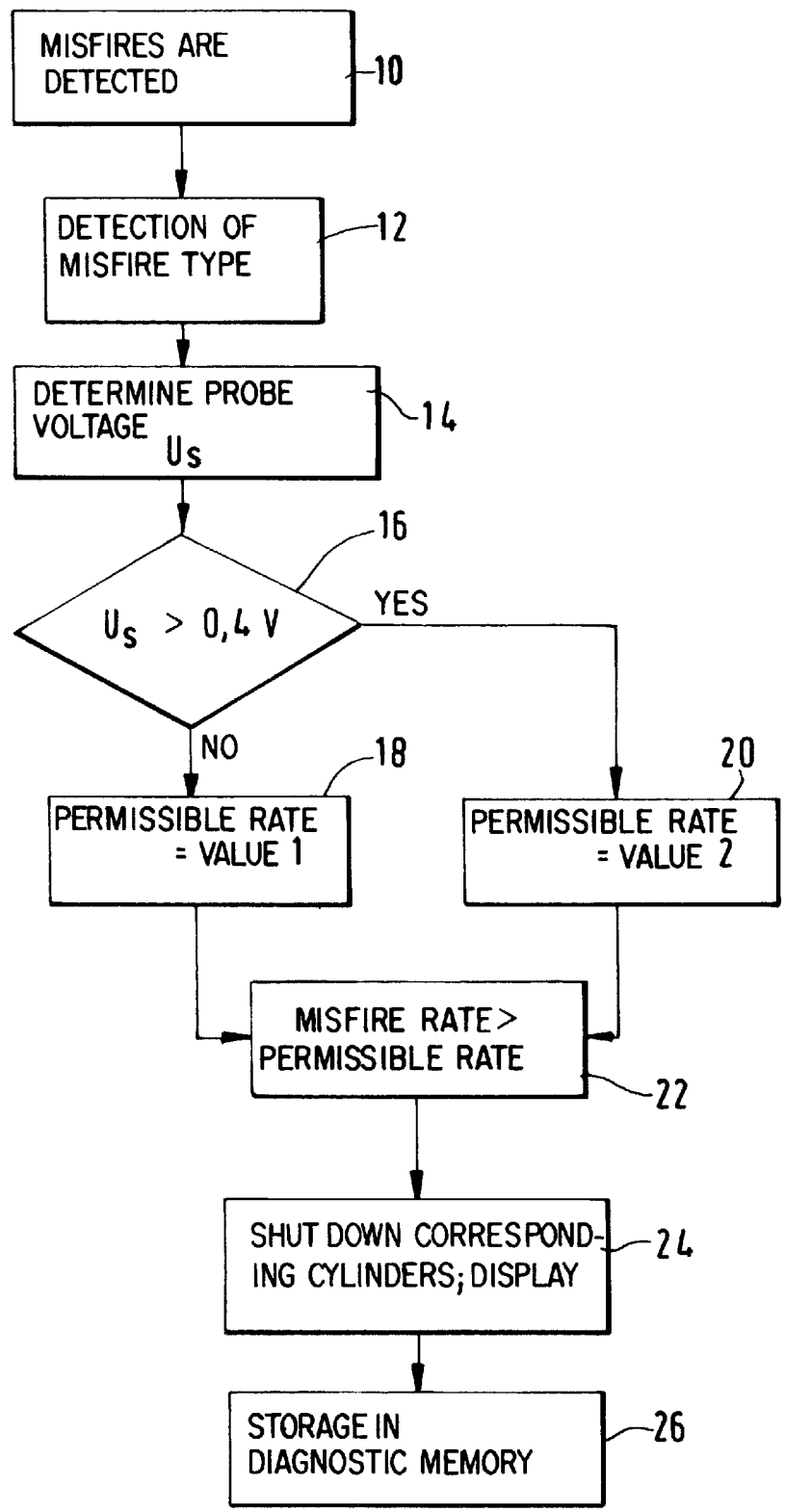
FIG. 1 is a flow chart of a method according to the invention.

According to the flow chart in FIG. 1, it is first recognized generally, by way of an analysis of a (not shown) rotational speed signal of the engine, that a misfire is present in one or more cylinders (step 10). After this basic misfire recognition by way of the rotational speed analysis, recognition of the type of misfire is commenced (step 12). In a next step 14, the probe voltage of the probe $U_B$ arranged downstream of the catalyst is determined, and in step 16, a further determination is made whether such probe voltage $U_S$ related to the recognized cylinder misfiring is larger than a defined threshold value. Presently, a threshold value of 0.4 V is used. (As an alternative, two threshold values may also be used. For example, in the case of the Bosch LSH 25 lambda probe, a voltage of 0.6 V and more indicates a rich mixture and a voltage of 0.1 V and less indicates a lean mixture.) In order to avoid errors because of voltage signal fluctuations in the case of the lambda probe, an average probe voltage can also be determined during several working cycles of the cylinder.

Depending on the result of the check of the probe voltage $U_S$ in step 16, a permissible misfire rate is set to a first value __1 in step 18 (no) or to a second value __2 in step 2 (yes). The permissible rate is used to determine when a cylinder, in which a misfire was recognized, must be switched off.

In step 22, the misfire rate actually existing in one or several cylinders is now compared with the permissible rate defined in steps 18 and 20.

If the misfire rate in step 22 is higher than the permissible rate, the corresponding cylinder or cylinders are switched off, and a display (reference number 24) for the driver take place. In addition, the misfire rate and the type of misfire are stored in a diagnostic memory (reference number 26). If the misfire rate in step 22 is lower than the desired rate, no switch-off of the cylinder takes place.

In this manner, depending on the type of misfire (ignition or injection), a change-over can take place to another misfire limit rate. However, in the case of a probe fault or a cold probe, the more critical condition (an ignition misfire) will always be assumed.

Misfiring with respect to exhaust-gas relevant misfires remains unaffected by this above-mentioned type of analysis, thus ensuring conformity with existing laws. In addition to the fault types "ignition system/combustion" at a probe voltage higher than 0.6 V and lack of fuel at a probe voltage $U_S$ of less than 0.1 V, an "implausible" fault type can also be indicated in an intermediate range.

Figure 2:
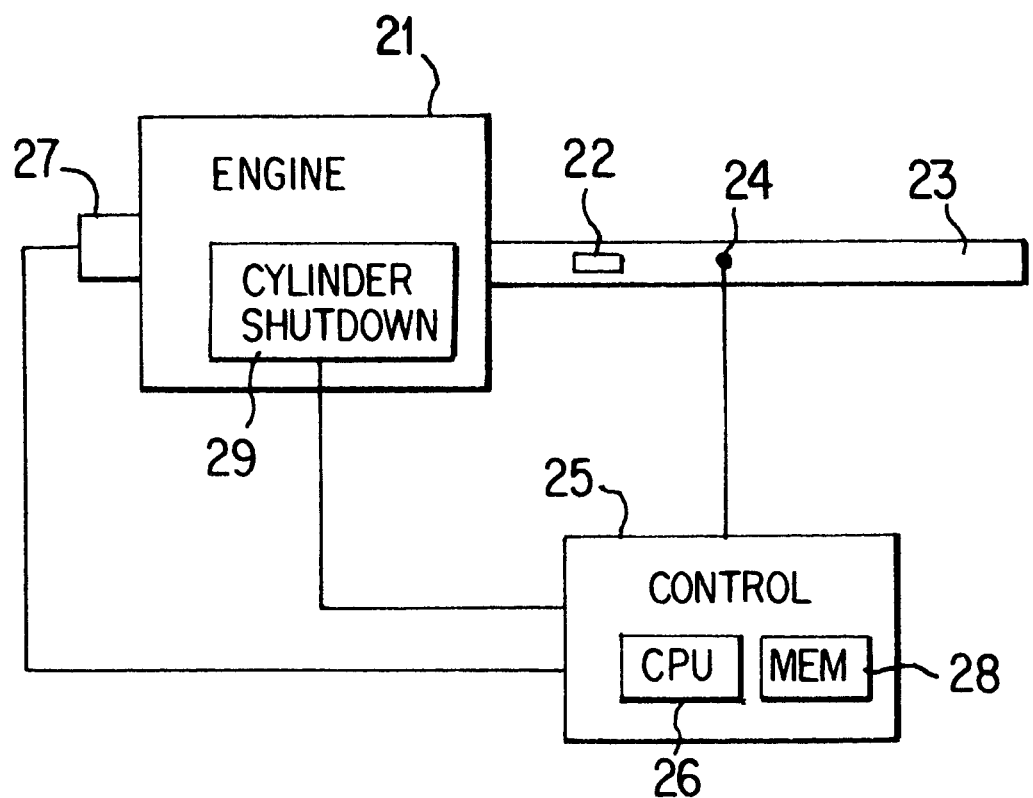
FIG. 2 is a schematic diagram of an arrangement for controlling engine operation according to the invention.

FIG. 2 is a schematic diagram of an arrangement for selectively shutting down operation of a cylinder or cylinders of an internal combustion engine 21, having an exhaust cleaning catalyst 22 arranged in the exhaust gas flow path 23, depending on the occurrence and type of a detected misfire. The voltage output from a lambda probe 24 is input to a control unit 25, which has a CPU 26. A sensor 27 detects an uneven running of the internal combustion engine 21, and provides a signal indicative thereof to the control unit 25. The control unit also includes a memory 28 in the form of, for example, a ROM which is encoded with a program for analyzing the outputs from the lambda probe 24 and the sensor 27 to determine the occurrence and type of a misfiring in a cylinder or cylinders of the internal combustion engine 21, and shut to down the misfiring cylinder or cylinders, via a shutdown mechanism 29, when the actual engine misfire rage (detected by sensor 27 or by another sensor provided for that purpose) exceeds a maximum permissible misfire rate, dependent on the type of misfire that is detected.

Instead of lambda probes, temperature sensors or $NO_x$ sensors can be used as alternatives for the detection.

According to the invention, an unnecessary switch-off of a cylinder can be prevented. As a result, warranty costs can be lowered, because components must be exchanged less frequently.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for treating catalyst-damaging misfires in an internal-combustion engine having a lambda probe arranged behind a catalyst, in a gas flow path, said method comprising:

detecting an occurrence of combustion misfires in at least one cylinder of the internal-combustion engine, by one of an analysis of rotational engine speeds and another techniques for detection of the erratic running of the engine;

detecting a lambda probe voltage associated with the detected combustion misfires;

determining whether a detected misfire is a catalyst damaging type of misfire as a function of probe voltage; and shutting down at least one misfiring engine cylinder only when a detected misfire is determined to be a catalyst damaging misfire.

2. Method according to claim 1, wherein said step of determining a type of the detected misfire comprises:

comparing the lambda probe voltage with a first limit value;

concluding that a combustion misfire is due to faulty ignition if the lambda probe voltage exceeds the first limit value; and concluding that a combustion misfire is due to faulty injection if the lambda probe voltage is below the first limit value.

3. Method according to claim 1, wherein said step of determining a type of the detected misfire comprises:

comparing the lambda probe voltage with first and second limit values;

concluding that a combustion misfire is due to faulty ignition if the lambda probe voltage exceeds the first limit value;

concluding that a combustion misfire is due to faulty injection if the lambda probe voltage is below the second limit value; and concluding that a combustion misfire is due to another faulty function, if the lambda probe voltage is between the first and second limit value.

4. Method according to claim 2, wherein:

a transition probe is used as the lambda probe; and the first limit value is set between 0.1 and 0.6 volt.

5. Method according to claim 3, wherein:

a transition probe is used as a lambda probe;

the first limit value is set between 0.4 and 0.8 volts; and the second limit value is set between 0 and 0.2 volt.

6. Method according to claim 1, wherein broad-band probe is used as the lambda probe.

7. Method according to claim 2, wherein a broad-band probe is used as the lambda probe.

8. Method according to claim 1, at least one of misfires and misfire types are stored in a memory of a diagnostic unit.

9. Method according to claim 1, wherein the signal of the lambda probe is filtered before the analysis.

10. Method according to one claim 1, wherein an average is taken of the signals of the lambda probe during the time period in which a misfire has occurred.

11. Method according to claim 1, at least one of gas running time and a time for the flooding of the catalyst with oxygen are taken into account.

12. A method for detecting exhaust-gas-impairing misfires and catalyst-damaging misfires in an internal-combustion engine having a lambda probe arranged behind a catalyst, in a gas flow path, said method comprising:

detecting an occurrence of combustion misfires in at least one cylinder of the internal-combustion engine, by one of an analysis of rotational engine speeds and another techniques for detection of the erratic running of the engine;

detecting a lambda probe voltage associated with the detected combustion misfires; and determining a type of the detected misfires as a function of probe voltage;

wherein a misfire limit rate at which a fault is reported and/or at least one cylinder is switched off, is selected as a function of the determined misfire type.

13. A method of operating an internal combustion engine having a lambda probe arranged downstream of an exhaust purifying catalyst in an exhaust gas flow path, said method comprising:

detecting occurrence of a misfiring in at least one cylinder of the internal combustion engine, by analysis of a parameter indicative of uneven running of said engine;

detecting an output voltage of said lambda probe associated with a detected misfiring;

determining a type of detected misfiring as a function of said output voltage;

setting a maximum permissible misfire rate as a function of a determined type of misfiring;

measuring an actual misfire rate in said at least one cylinder; and shutting down said at least one cylinder when said actual misfire rate exceeds said maximum permissible misfire rate.

14. A method according to claim 13, wherein said parameter indicative of uneven running of said engine is engine rotational speed.

15. A method according to claim 13, wherein said step of determining a type of a detected misfiring comprises:

comparing the lambda probe voltage with a first limit value;

concluding that a combustion misfire is due to faulty ignition if the lambda probe voltage exceeds the first limit value; and concluding that a combustion misfire is due to faulty injection if the lambda probe voltage is below the first limit value.

16. A method according to claim 13, wherein said step of setting a maximum permissible misfire rate comprises:

setting said maximum permissible rate at a first value in the case of a misfire due to faulty ignition; and setting said maximum permissible rate at a second value in the case of a misfire due to a faulty injection.

17. Apparatus for detecting and identifying a type of combustion misfiring in an internal combustion engine having an exhaust purifying catalyst in an exhaust gas flow path, comprising:

a lambda probe arranged downstream of said catalyst in said gas flow path;

a sensor for detecting uneven engine operation; and a control unit having a CPU programmed for detecting an occurrence of combustion misfires in at least one cylinder of the internal-combustion engine, by one of an analysis of rotational engine speeds and another techniques for detection of the erratic running of the engine;

detecting a lambda probe voltage associated with the detected combustion misfires; and determining a type of the detected misfires as a function of probe voltage.

18. Apparatus for controlling operation of an internal combustion engine having an exhaust purifying catalyst arranged in an exhaust gas flow path, comprising:

a lambda probe arranged downstream of said exhaust gas purifying catalyst in said gas flow path;

a sensor for detecting uneven engine operation;

means for selectively shutting down operation of cylinders of said internal combustion engine, and a control unit having a CPU programmed for detecting occurrence of a misfiring in at least one cylinder of the internal combustion engine, by analysis of an output signal of said sensor;

detecting an output voltage of said lambda probe associated with a detected misfiring;

determining a type of detected misfiring as a function of said output voltage;

setting a maximum permissible misfire rate as a function of a determined type of misfiring;

measuring an actual misfire rate in said at least one cylinder; and shutting down said at least one cylinder when said actual misfire rate exceeds said maximum permissible misfire rate.

* * * * *